(12) United States Patent
Matsuzawa et al.

(10) Patent No.: US 11,173,810 B2
(45) Date of Patent: Nov. 16, 2021

(54) SEAT OPENING CONCEALMENT STRUCTURE

(71) Applicant: NHK Spring Co., Ltd., Yokohama (JP)

(72) Inventors: Tsuyoshi Matsuzawa, Yokohama (JP); Kenichi Katsube, Yokohama (JP); Daisuke Tanaka, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/861,278

(22) Filed: Apr. 29, 2020

(65) Prior Publication Data

US 2020/0353845 A1 Nov. 12, 2020

(30) Foreign Application Priority Data

May 10, 2019 (JP) .............................. JP2019-090114

(51) Int. Cl.
| | |
|---|---|
| *B60N 2/10* | (2006.01) |
| *B60N 2/34* | (2006.01) |
| *B60N 2/90* | (2018.01) |
| *B60N 2/838* | (2018.01) |
| *B60N 2/58* | (2006.01) |

(52) U.S. Cl.
CPC ................. *B60N 2/10* (2013.01); *B60N 2/34* (2013.01); *B60N 2/58* (2013.01); *B60N 2/838* (2018.02); *B60N 2/995* (2018.02)

(58) Field of Classification Search
CPC .......... B60N 2/10; B60N 2/838; B60N 2/995; B60N 2/34; B60N 2/58; B60N 2/806; B60N 2/853

USPC ........................................................ 297/313
See application file for complete search history.

(56) References Cited

U.S. PATENT DOCUMENTS

| | | | | |
|---|---|---|---|---|
| 4,693,515 A | * | 9/1987 | Russo ................... | B60N 2/838 |
| | | | | 297/391 |
| 2014/0339875 A1 | * | 11/2014 | Sunaga .................. | B60N 2/847 |
| | | | | 297/408 |
| 2017/0291516 A1 | * | 10/2017 | Tat ......................... | B60N 2/885 |

(Continued)

FOREIGN PATENT DOCUMENTS

JP 2014223842 12/2014

*Primary Examiner* — Mark R Wendell
(74) *Attorney, Agent, or Firm* — Dority & Manning, P.A.

(57) ABSTRACT

A seat opening concealment structure is provided including a cover member that covers part of a vehicle seat, and that includes an outer wall including a curved face portion with a circular arc shaped cross-section profile, the outer wall being formed with an opening having an elongated profile along a peripheral direction of the curved face portion, and the outer wall being formed with a larger radius of curvature at an inner face of the curved face portion than a radius of curvature at an outer face of the curved face portion. The seat opening concealment structure further includes a rotatable body that is supported via a coupling section inserted through the opening so as to be rotatable relative to the cover member, and a concealing sheet that is provided with an attachment hole at which the coupling section is attached, that is longer than a length of the opening, that is supported at two width direction end portions of the concealing sheet so as to be slidable along the inner face of the outer wall, and that covers the opening.

6 Claims, 11 Drawing Sheets

(56) References Cited

U.S. PATENT DOCUMENTS

2019/0359087 A1\* 11/2019 Galan Garcia .......... B60N 2/14
2020/0196765 A1\* 6/2020 Texeraud ........... B64D 11/0641

\* cited by examiner

SEAT OPENING CONCEALMENT STRUCTURE

CROSS-REFERENCE TO RELATED APPLICATION

This application is based on and claims priority under 35 USC 119 from Japanese Patent Application No. 2019-090114 filed on May 10, 2019, the disclosure of which is incorporated by reference herein.

BACKGROUND

Technical Field

The present disclosure relates to a seat opening concealment structure.

Related Art

Japanese Patent Application Laid-Open (JP-A) No. 2014-223842 discloses a configuration in which a headrest of a vehicle seat is attached to a seatback through a stay (coupling section) so as to be capable of pivoting. In this document, an elongated hole (opening) through which the stay is inserted is formed in a bottom plate that covers a lower face of the headrest. A concealing sheet to cover this elongated hole is slidably supported on the bottom plate in a state attached to the stay. The concealing sheet is able to keep the elongated hole covered at all times by moving relative to the bottom plate when the headrest pivots, thereby enabling foreign objects to be suppressed from entering the headrest interior.

However, when the diversifying trends in vehicle seat technology are considered, openings formed in a vehicle seat are not limited to elongated holes such as that described above.

For example, cases may be envisaged in which an opening is formed along an outer wall configuring a curved face of a vehicle seat. Applying the structure disclosed in JP-A No. 2014-223842 to an opening in an outer wall with a small radius of curvature would result in the concealing sheet being heavily bent to follow a design face (outer face) on the outer wall. This would increase interference between an inner face of the outer wall and the concealing sheet, which might prevent the concealing sheet from sliding smoothly.

SUMMARY

In consideration of the above circumstances, an object of the present disclosure is to obtain a seat opening concealment structure in which a concealing sheet covering an opening formed in a vehicle seat is capable of sliding smoothly.

A seat opening concealment structure according to a first aspect of the present disclosure includes a cover member that covers part of a vehicle seat, and that includes an outer wall including a curved face portion with a circular arc shaped cross-section profile, the outer wall being formed with an opening having an elongated profile along a peripheral direction of the curved face portion, and the outer wall being formed with a larger radius of curvature at an inner face of the curved face portion than a radius of curvature at an outer face of the curved face portion. The seat opening concealment structure further includes a rotatable body that is supported via a coupling section inserted through the opening so as to be rotatable relative to the cover member, and a concealing sheet that is provided with an attachment hole at which the coupling section is attached, that is longer than a length of the opening, that is supported at two width direction end portions of the concealing sheet so as to be slidable along the inner face of the outer wall, and that covers the opening.

In the seat opening concealment structure according to the first aspect of the present disclosure, the vehicle seat is provided with the cover member that covers part of the seat. The outer wall of the cover member is configured including the curved face portion that has a circular arc shaped cross-section profile, and the opening that is elongated in the peripheral direction of the curved face portion is formed through the curved face portion. The vehicle seat further includes the rotatable body that is supported through the coupling section inserted through the opening so as to be capable of pivoting relative to the cover member. The concealing sheet provided with the attachment hole to which the coupling section is attached is supported by the outer wall so as to be capable of sliding along the inner face. The concealing sheet is longer than the length of the opening, and is disposed so as to cover the opening. Accordingly, the concealing sheet is able to keep the opening covered at all times by moving relatively along the inner face of the outer wall when the rotatable body pivots.

Moreover, the inner face of the curved face portion of the outer wall is formed with a larger radius of curvature than the outer face of the curved face portion. In other words, at the curved face portion the inner face that contacts the concealing sheet is formed with a gentler curve than the curve of the outer face. This reduces interference between the inner face and the concealing sheet, thereby enabling the concealing sheet to slide smoothly.

A seat opening concealment structure according to a second aspect of the present disclosure is the configuration of the first aspect, wherein an inner wall is provided inside the cover member so as to be disposed opposing the outer wall, so as to extend along at least the curved face portion, and so as to cover the two end portions of the concealing sheet, and the two end portions of the concealing sheet are respectively inserted into a gap formed between the outer wall and the inner wall.

In the seat opening concealment structure according to the second aspect of the present disclosure, the two end portions of the concealing sheet are covered by the inner wall at least at a location at a position corresponding to the curved face portion. Accordingly, if the concealing sheet wobbles due to interference with the outer wall, the two end portions of the concealing sheet abut and are supported by the inner walls. This enables movement of the concealing sheet to be stabilized.

A seat opening concealment structure according to a third aspect of the present disclosure is the configuration of the second aspect, wherein the concealing sheet extends so as to straddle the curved face portion of the outer wall and a flat face portion at which the outer wall is formed with a flat face continuing from the curved face portion, and the gap formed between the outer wall and the inner wall is formed so as to be larger at the curved face portion than at the flat face portion.

In the seat opening concealment structure according to the third aspect of the present disclosure, since the concealing sheet wobbles due to interference between the concealing sheet and the outer wall, the gap between the outer wall and the inner wall is set larger at the curved face portion where interference is comparatively great so as not to impede movement of the concealing sheet. On the other hand, the gap between the outer wall and the inner wall at the flat face portion where interference is lower than at the curved face portion is set smaller, thereby stabilizing the disposition and movement of the concealing sheet. The concealing sheet is able to slide even more smoothly as a result.

A seat opening concealment structure according to a fourth aspect of the present disclosure is the configuration of the third aspect, wherein a radius of curvature of the inner face of the outer wall is larger than a radius of curvature of the outer face of the outer wall, whereby that a plate thickness of the outer wall at the curved face portion is thicker than a plate thickness of the outer wall at the flat face portion, and a plate thickness of the inner wall at a location disposed opposing the curved face portion is thinner than a plate thickness of the inner wall at a location disposed opposing the flat face portion.

In the seat opening concealment structure according to the fourth aspect of the present disclosure, the plate thickness of the outer wall is thicker at the curved face portion than at the flat face portion, while the plate thickness of the inner wall is set thinner at the location opposing the curved face portion than at the location opposing the flat face portion by a commensurate amount. This suppresses an increase in the combined plate thicknesses of the cover member at the curved face portion, thereby enabling optimal plate thickness to be achieved throughout the overall cover member.

A seat opening concealment structure according to a fifth aspect of the present disclosure is the configuration of any one of first aspect to the fourth aspect, wherein the cover member is disposed so as to cover a leading end of a seat section configuring a vehicle seat, the seat section being coupled to a base section fixed to a vehicle floor and configured to tilt about an axis with an axial direction along the seat width direction and to support either an upper body or a lower body of a seated occupant. Moreover, the rotatable body is supported by the cover member so as to be rotatable between a headrest position and an ottoman position. The rotatable body is configured to support the head of the seated occupant in a state in which the rotatable body is positioned at the headrest position, and the cover member is configured to support the feet of the seated occupant in a state in which the rotatable body is positioned at the ottoman position.

In the seat opening concealment structure according to the fifth aspect of the present disclosure, the occupant seated in the vehicle seat is able to set the seat section to a desired angle and use the cover member covering the leading end portion of the seat section as an ottoman on which to place their feet, or use the rotatable body coupled to the cover member as a headrest on which to rest their head. Foreign objects, for example foreign objects stuck to the feet of the seated occupant, can be suppressed from entering the interior of the seat section. Moreover, since the concealing sheet is able to slide smoothly, movement of the rotatable body can be stabilized.

As described above, the seat opening concealment structure according to the present disclosure enables a concealing sheet covering an opening formed in a vehicle seat to slide smoothly.

BRIEF DESCRIPTION OF THE DRAWINGS

Exemplary embodiments of the present invention will be described in detail based on the following figures, wherein.

DETAILED DESCRIPTION

Explanation follows regarding a vehicle seat 10 applied with a seat opening concealment structure according to an exemplary embodiment, with reference to FIG. 1 to FIG. 11. Note that in the drawings, the arrow FR indicates a seat front side, the arrow UP indicates a seat upper side, and the arrow LH indicates a seat left hand side (one side in a seat width direction) of the vehicle seat 10, as appropriate. Unless specifically indicated, in the present exemplary embodiment the seat front side, seat upper side, and seat left hand side of the vehicle seat 10 correspond to a vehicle front side, a vehicle upper side, and a vehicle left hand side of a vehicle (automobile) to which the vehicle seat 10 is installed. Some reference numerals may be omitted from the drawings in the interests of simplicity.

Vehicle Seat 10

Figure 1:
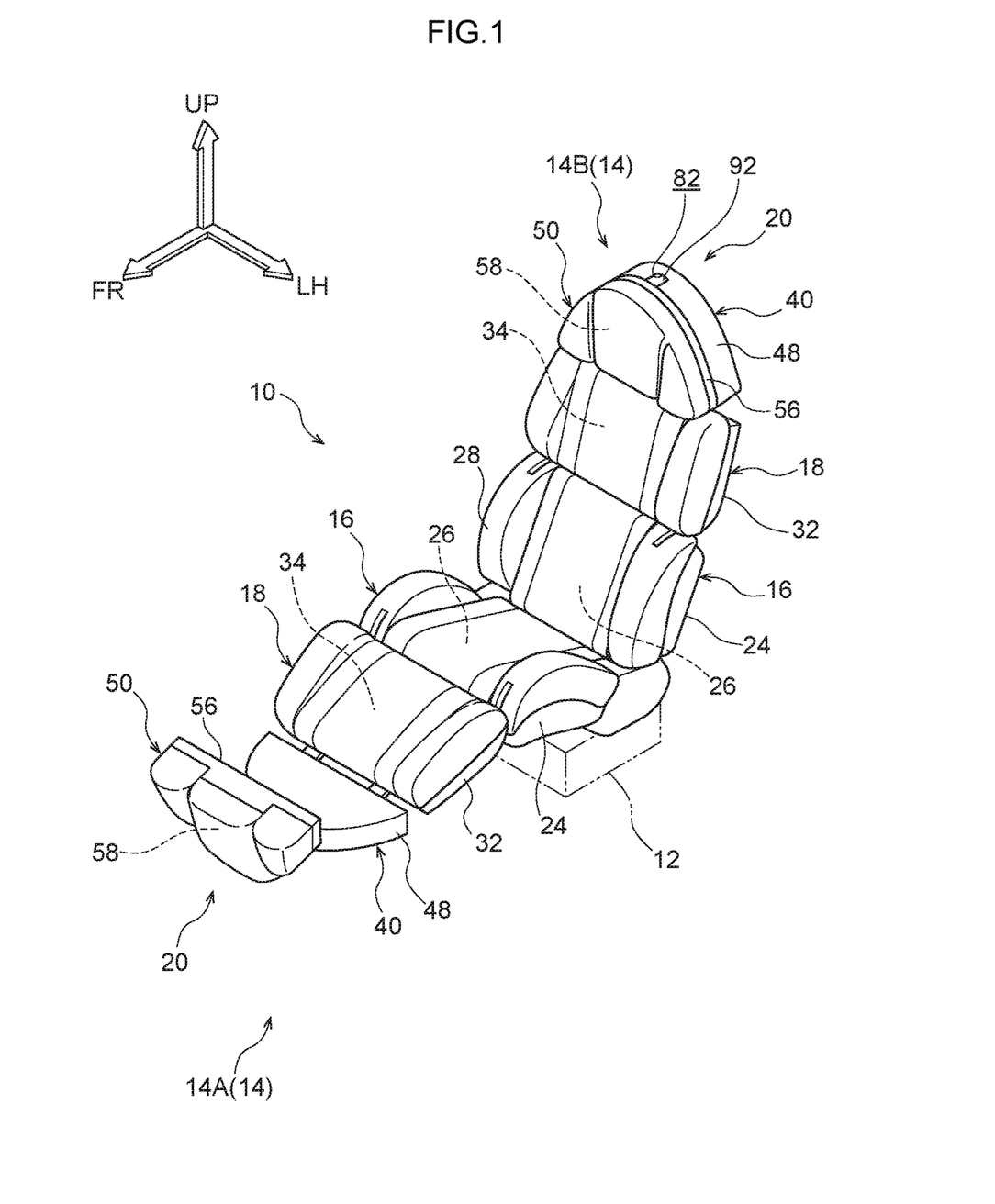
FIG. 1 is a perspective view illustrating a vehicle seat including an upper cushion section applied with a seat opening concealment structure according to an exemplary embodiment.
Figure 2:
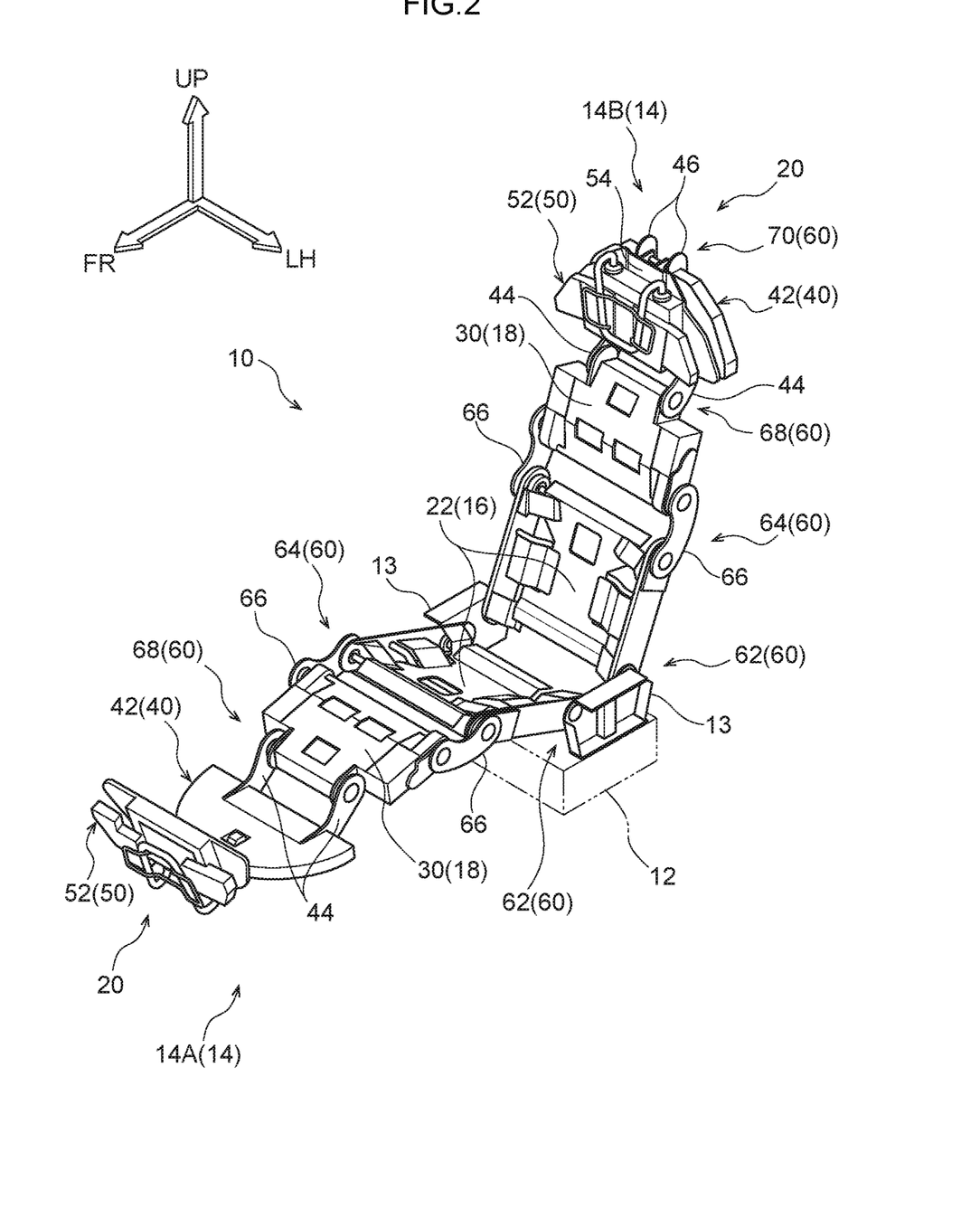
FIG. 2 is a perspective view corresponding to FIG. 1, illustrating framework members of the vehicle seat.

FIG. 1 is a perspective view illustrating a state in which the seat orientation of the vehicle seat 10 has been set to a forward-facing orientation (an orientation aligned with the direction of vehicle travel). FIG. 2 is a perspective view illustrating framework members of the vehicle seat 10. As illustrated in FIG. 1 and FIG. 2, the vehicle seat 10 includes a base section 12 configuring a lower section of the vehicle seat 10, and a pair of seat sections 14 tiltably supported by the base section 12. Each of the pair of seat sections 14 is configured including a lower cushion section 16, a middle cushion section 18, and an upper cushion section 20 disposed in series. Framework members configuring these sections are coupled together by hinge mechanisms 60 located inside the respective seat sections 14.

Base Section 12

The base section 12 is, for example, formed by pressing sheet metal, and is fixed to a vehicle floor using non-illustrated fastenings. The pair of seat sections 14 are installed above the base section 12. The base section 12 and the seat sections 14 are coupled together through first hinges 62 included in the hinge mechanisms 60, described later. Each of the pair of seat sections 14 is supported by the base section 12 so as to be capable of tilting about an axis running in the seat width direction.

Pair of Seat Sections 14

The pair of seat sections 14 are disposed opposing each other as viewed along the seat width direction, and are structurally symmetrical about the base section 12. In FIG. 1 and FIG. 2, for ease of explanation the seat section disposed toward the seat front-rear direction front side of the vehicle seat 10 is labelled a seat section 14A, and the seat section disposed toward the seat front-rear direction rear side of the vehicle seat 10 is labelled a seat section 14B.

The seat sections 14A, 14B are each configured by the lower cushion section 16, the middle cushion section 18, and the upper cushion section 20, serially arranged in this sequence on progression from a base end of the seat section 14 toward a leading end of the seat section 14 so as to support the body of an occupant seated in the vehicle seat 10. The lower cushion section 16, the middle cushion section 18, and the upper cushion section 20 are respectively coupled together by a second hinge 64 and a third hinge 68 included in the hinge mechanisms 60.

Lower Cushion Section 16

As illustrated in FIG. 1 and FIG. 2, each of the lower cushion sections 16 includes a lower frame 22 configuring a framework member of the lower cushion section 16. The lower frame 22 is, for example, formed by pressing sheet metal, and is formed in a substantially rectangular shape overall when viewed face-on. A seat back face side of the lower frame 22 has a case shape opening toward a seat front face side, and is covered by an integrally formed resin lower casing 24. A seat front face side of the lower frame 22 is covered by a lower pad 26. The lower pad 26 is configured from a foamed material such as urethane, and is covered by a surface covering 28.

One end of the lower frame 22 in a direction orthogonal to the seat width direction is tiltably coupled to the base section 12 through the first hinge 62. The first hinge 62 is configured by a known powered round recliner mechanism, and includes a non-illustrated electric motor serving as a drive source and a non-illustrated shaft configuring an output shaft of the electric motor. The shaft is disposed with its axial direction in the seat width direction, and connection portions 13 (see FIG. 2) projecting upright from an upper face of the base section 12 and one end of the lower frame 22 are connected to both axial direction end portions of the shaft. The lower cushion section 16 is thus capable of tilting relative to the base section 12 when the electric motor rotates forward or in reverse.

The lower frame 22 is coupled to the middle cushion section 18 through the second hinge 64 at the other end of the lower frame 22 in the direction orthogonal to the seat width direction so as to be capable of pivoting.

Middle Cushion Section 18

The middle cushion section 18 includes a middle frame 30 configuring a framework member of the middle cushion section 18. The middle frame 30 is, for example, formed by pressing sheet metal, and is formed in a substantially rect-angular shape overall when viewed face-on. A seat back face side of the middle frame 30 has a case shape opening toward a seat front face side, and is covered by an integrally formed resin middle casing 32. A seat front face side of the middle frame 30 is covered by a middle pad 34. The middle pad 34 is configured from a foamed material such as urethane, and is covered by the surface covering 28.

One end of the middle frame 30 in the direction orthogonal to the seat width direction is coupled to the lower frame 22 through the second hinge 64 so as to be capable of pivoting. The second hinge 64 is provided on both seat width direction sides of the seat section 14, and includes a pair of links 66 having a length direction running in a direction substantially orthogonal to the seat width direction. Both length direction end portions of each of the pair of links 66 are disposed at the inner sides of the lower casing 24 and the middle casing 32 respectively. Moreover, each of these end portions are coupled to one end of the lower frame 22 or one end of the middle frame 30 through a powered round recliner mechanism similar to that of the first hinge 62 described above. Namely, the second hinge 64 includes a pair of shafts joined to the lower frame 22 and the middle frame 30 respectively. The two axial direction end portions of each of the pair of shafts configure a double hinge mechanism, and are coupled together through the pair of links 66. The middle cushion section 18 is thus capable of pivoting relative to the lower cushion section 16 about an axis running in the seat width direction when electric motors fixed to the respective shafts rotate forward or in reverse.

The other end of the middle frame 30 in the direction orthogonal to the seat width direction is coupled to the upper cushion section 20 through the third hinge 68 so as to be capable of pivoting.

Upper Cushion Section 20

As illustrated in FIG. 1 to FIG. 5, the upper cushion section 20 is configured including an ottoman section 40 disposed at a leading end portion of the corresponding seat section 14, and a headrest section 50 supported by the ottoman section 40 so as to be capable of pivoting. The ottoman section 40 includes an ottoman frame 42 serving as a framework member (see FIG. 2 and FIG. 5). Note that the headrest section 50 corresponds to a rotatable body of the present disclosure.

The ottoman frame 42 is, for example, formed by pressing sheet metal, and is formed in a substantially trapezoid plate shape. A base end portion side of the ottoman frame 42 (corresponding to the lower base of the trapezoid shape) is provided with a pair of coupling brackets 44 extending toward the middle cushion section 18. Each of the coupling brackets 44 is formed in an elongated shape with its plate thickness direction aligned with the seat width direction, and a leading end portion of each of the coupling brackets 44 is coupled to the other end of the middle frame 30 through the third hinge 68.

Similarly to the first hinge 62 described above, the third hinge 68 is configured by a known powered round recliner mechanism, and is coupled to the other end of the middle frame 30 and to leading end portions of the pair of coupling brackets 44 through a shaft (not illustrated in the drawings) with its axial direction along the seat width direction. The ottoman section 40 pivots relative to the middle cushion section 18 about an axis running in the seat width direction when an electric motor (not illustrated in the drawings) serving as a drive source rotates forward or in reverse.

A leading end side of the ottoman frame 42 (corresponding to the upper base of the trapezoid shape) is provided with a coupling section 70 included in the hinge mechanisms 60 between a pair of fixing plates 46 that project upright toward the leading end side of the ottoman frame 42. A front face of the ottoman frame 42 is covered by a cover member 48 configuring a seat opening concealment structure according to the present exemplary embodiment.

Figure 5:
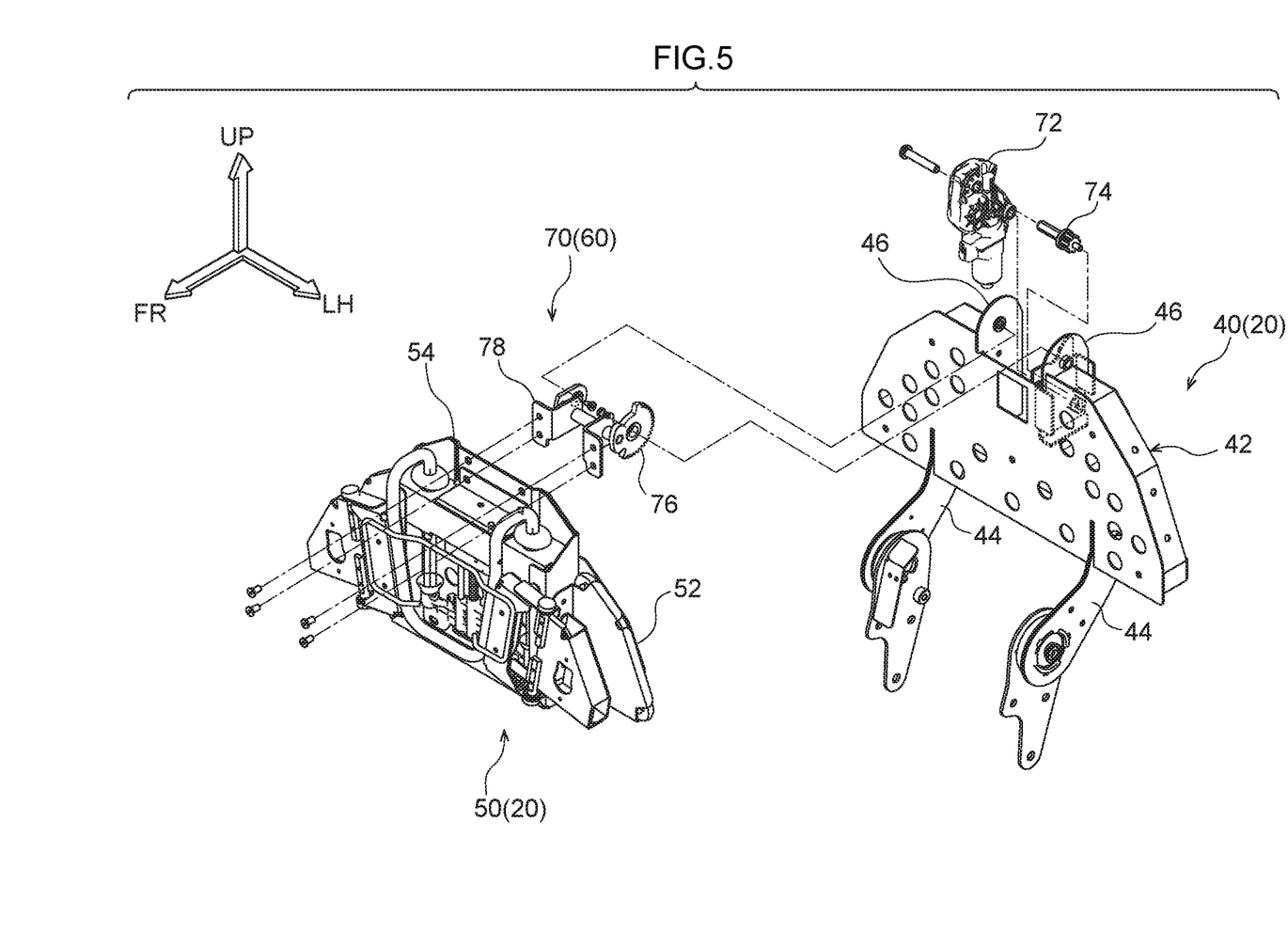
FIG. 5 is an exploded perspective view to explain the structure of the upper cushion section of the vehicle seat.

As illustrated in FIG. 2 and FIG. 5, the headrest section 50 includes a headrest frame 52, serving as a framework member. Similarly to the ottoman frame 42, the headrest frame 52 is formed in a substantially trapezoid plate shape. A support plate 54 projects upright from a leading end side of the headrest frame 52 (corresponding to the upper base of the trapezoid shape), and the headrest frame 52 is fixed to the coupling section 70 through the support plate 54.

Figure 3:
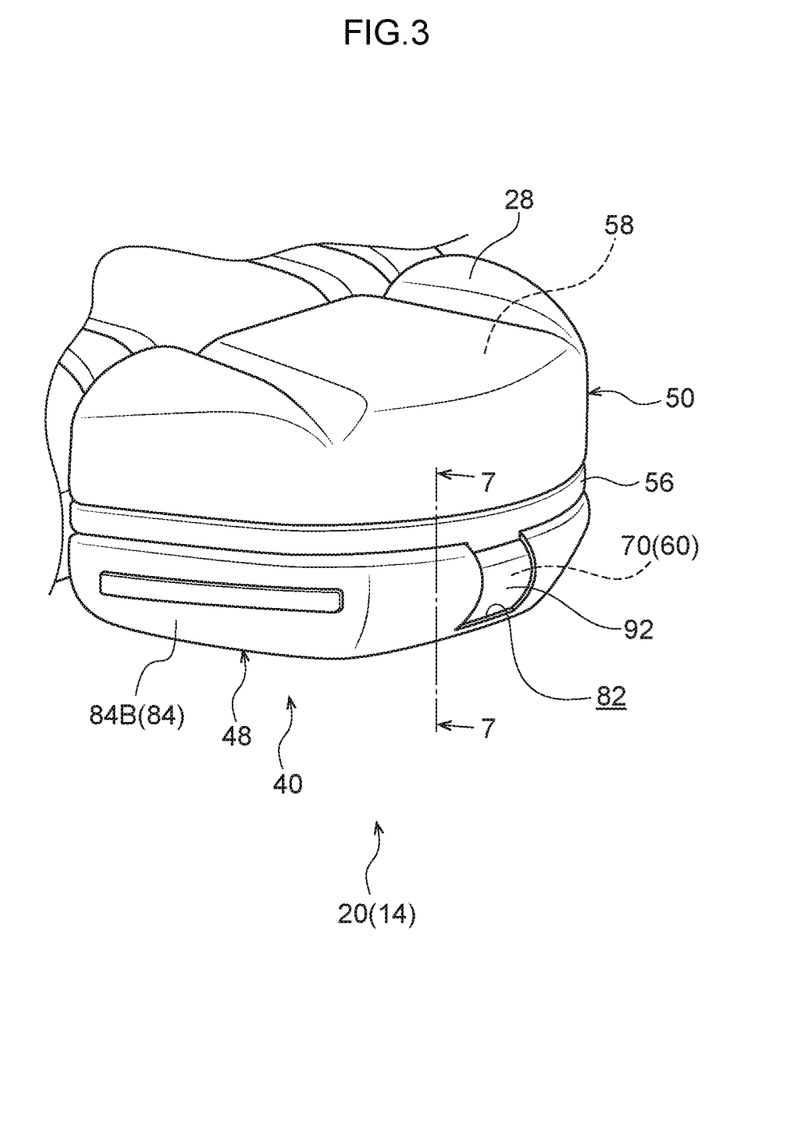
FIG. 3 is a perspective view illustrating the upper cushion section of the vehicle seat in a state in which a headrest section is set to a headrest position.
Figure 4:
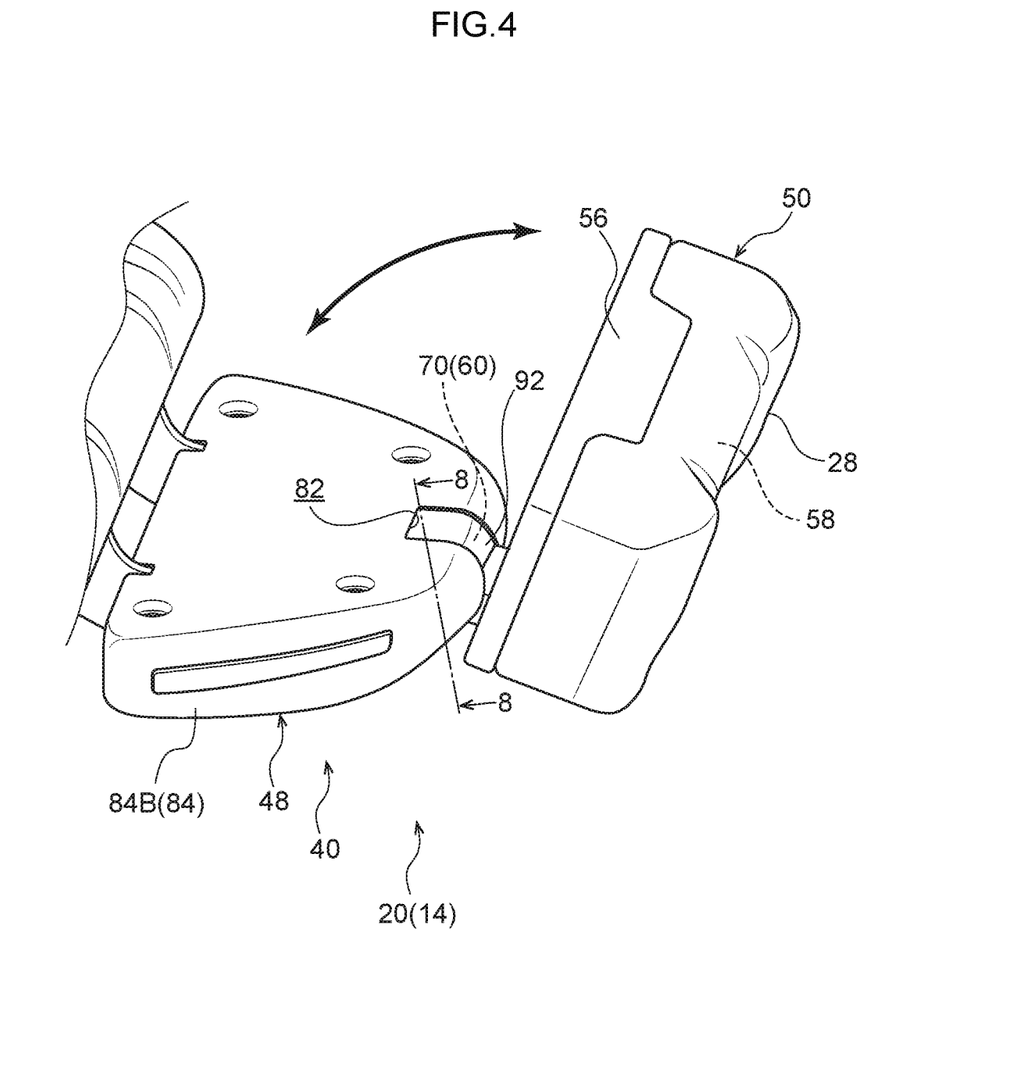
FIG. 4 is a perspective view illustrating the upper cushion section of the vehicle seat in a state in which the headrest section is set to an ottoman position.

As illustrated in FIG. 3 and FIG. 4, a seat back face side of the headrest frame 52 is covered by headrest casing 56. The headrest casing 56 is formed in a substantially trapezoid shape, and has a shallow-bottomed case shape opening toward the seat front face side. The seat front face side of the headrest frame 52 is covered by a headrest pad 58. The headrest pad 58 is configured from a foamed material such as urethane, and is covered by the surface covering 28.

As illustrated in FIG. 2 to FIG. 5, the coupling section 70 couples the ottoman section 40 and the headrest section 50 of the upper cushion section 20 together so as to be capable of pivoting. The coupling section 70 includes an electric motor 72 serving as a drive source, a pinion gear 74 configuring an output shaft of the electric motor 72, a sector gear 76 that meshes with the pinion gear 74, and a gear bracket 78 that fixes and supports the sector gear 76. The electric motor 72 is fastened and fixed to a seat width direction inner side of one of the fixing plates 46 that projects upright from the leading end portion of the ottoman frame 42 using motor bolts and nuts (neither of which are allocated a reference numeral).

The pinion gear 74 configuring the output shaft of the electric motor 72 is disposed with its axial direction along the seat width direction. Teeth formed to a leading end of the pinion gear 74 mesh with teeth of the sector gear 76.

The sector gear 76 is disposed with its axial direction along the seat width direction, and is fixed and supported by the gear bracket 78. The gear bracket 78 is, for example, formed by pressing sheet metal, and is fastened and fixed to the support plate 54 of the headrest frame 52 using plural non-illustrated bolts and nuts such that the leading end portion of the gear bracket 78 extends so as to link together the ottoman frame 42 and the headrest frame 52. Base end portions of the sector gear 76 and the gear bracket 78 are supported so as to be capable of pivoting by the pair of fixing plates 46 of the ottoman frame 42 using a pair of pins (not allocated reference numerals).

As illustrated in FIG. 3, FIG. 4, FIG. 7, and FIG. 8, a tube shaped housing 80 extending from the ottoman frame 42 toward the headrest frame 52 covers the periphery of the sector gear 76 and the gear bracket 78. The housing 80 is inserted through an opening 82 formed in the cover member 48 that covers the front face of the ottoman frame 42, and one axial direction end of the housing 80 is fixed to a rotation shaft Q of the coupling section 70 (the center of the sector gear 76). The other axial direction end portion of the housing 80 is fixed to a bottom face of the headrest casing 56.

Due to the configuration described above, in the coupling section 70, actuating the electric motor 72 causes the sector gear 76 to be rotated forward or in reverse through the pinion gear 74 configuring the output shaft. The rotation motion of the sector gear 76 is received by the gear bracket 78, which pivots relative to the ottoman frame 42. In this manner, the headrest section 50 is supported by the ottoman section 40 through the coupling section 70 so as to be capable of pivoting.

In the upper cushion section 20 of the present exemplary embodiment, the headrest section 50 is pivoted to change the position of the headrest section 50 between a "headrest position" and an "ottoman position". The headrest position refers to a state in which the ottoman section 40 and the headrest section 50 are folded over and superimposed on one another (FIG. 3). In this state, the headrest pad 58 of the headrest section 50 is disposed at the seat front face side of the upper cushion section 20. Accordingly, as illustrated in FIG. 1, in a seat mode in which the seat section 14B is standing upright toward the seat upper side and the upper body of a seated occupant is supported by the seat section 14B, the headrest section 50 is set to the headrest position in which the headrest pad 58 is capable of supporting the head of the seated occupant from the seat rear side.

On the other hand, the ottoman position refers to a state in which the headrest section 50 has been pivoted in a direction away from the ottoman section 40 (FIG. 4). In this state, the ottoman section 40 is disposed at the seat front face side of the upper cushion section 20. Accordingly, as illustrated in FIG. 1, in a seat mode in which the seat section 14A is disposed substantially along the seat front-rear direction and the lower body of the seated occupant is supported by the seat section 14A, the headrest section 50 is set in the ottoman position in which the ottoman section 40 is capable of supporting the feet of the seated occupant from the seat lower side.

Although not illustrated in the drawings, the vehicle seat 10 includes an electronic control unit (ECU) serving as a control device to control the hinge mechanisms 60. The ECU is configured by a microcomputer in which a CPU, ROM, RAM, and an input/output interface (I/O) are each connected to a bus. The I/O of the ECU is electrically connected to the plural electric motors included in the first hinge 62, the second hinge 64, the third hinge 68, and the coupling section 70 configuring the hinge mechanisms 60. The I/O of the ECU is also electrically connected to a non-illustrated operation section provided close to the vehicle seat 10. Switches are provided to the operation section in order to select between plural seat modes, enabling selection of a desired seat mode from out of plural (various) modes stored in advance in the ROM of the ECU. The ECU controls driving of the electric motors according to the mode selected using the mode selection switches.

Under the control of the ECU, the vehicle seat 10 can be set to a forward-facing seat orientation in which the seat section 14B stands upright as illustrated in FIG. 1. On the other hand, under the control of the ECU the vehicle seat 10 can also be set to a rearward-facing seat orientation in which the seat section 14A stands upright and the seat section 14B is disposed extending toward the seat rear side. Moreover, the ECU is also capable of changing the layout of the seat sections 14A, 14B so as to follow the posture of the seated occupant by controlling the tilt of the lower cushion sections 16, the middle cushion sections 18, and the upper cushion sections 20 as desired.

Seat Opening Concealment Structure

Explanation follows regarding the seat opening concealment structure according to the present exemplary embodiment. The seat opening concealment structure is applied to the opening 82 formed in the cover member 48 of the ottoman section 40 described above. The seat opening concealment structure is principally configured by the cover member 48 and a single concealing sheet 92.

Figure 6:
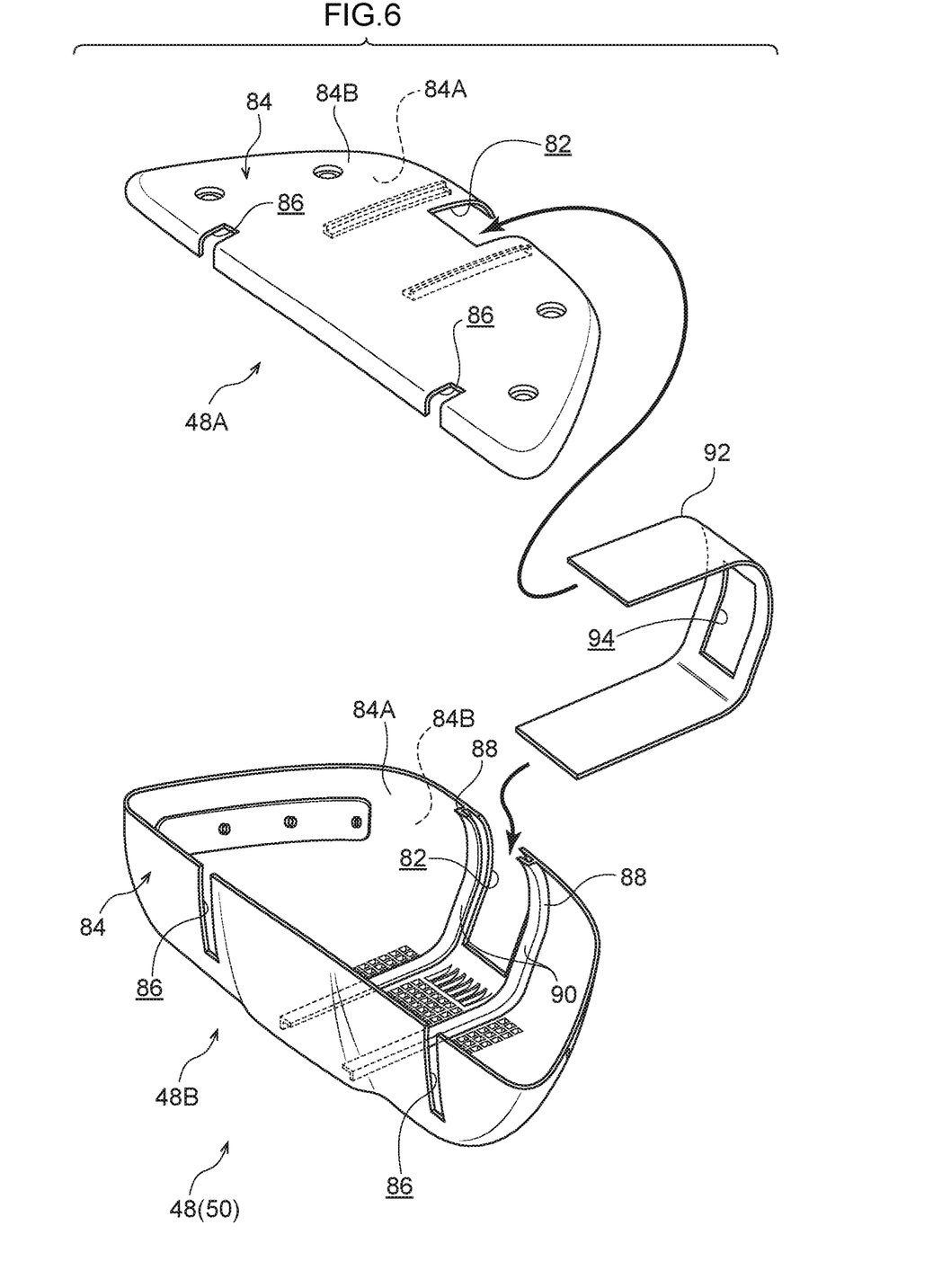
FIG. 6 is an exploded perspective view to explain a method for attaching a concealing sheet to an ottoman section of the upper cushion section of the vehicle seat.

As illustrated in FIG. 6, the cover member 48 is, for example, made from resin, and is formed as a flattened hollow case with an outer wall 84 configuring a design face. The cover member 48 is divided into top and bottom, and is configured by a mutually joined upper cover 48A and lower cover 48B. The upper cover 48A and the lower cover 48B are, for example, joined together by clips.

The upper cover 48A is formed as a substantially trapezoid shaped lid configuring an upper portion (seat front face side) of the cover member 48. The feet of the seated occupant can be placed on the upper cover 48A that is disposed on the seat front face side of the upper cushion section 20 when the position of the headrest section 50 has been set to the ottoman position. The lower cover 48B is configured as a substantially trapezoid shaped case opening toward the upper cover 48A, and configures a lower portion (seat back face side) of the cover member 48. A base end portion side of the lower cover 48B (corresponding to the lower base of the trapezoid shape) is formed with a pair of elongated holes 86 through which the pair of coupling brackets 44 provided to the ottoman frame 42 are inserted.

Figure 7:
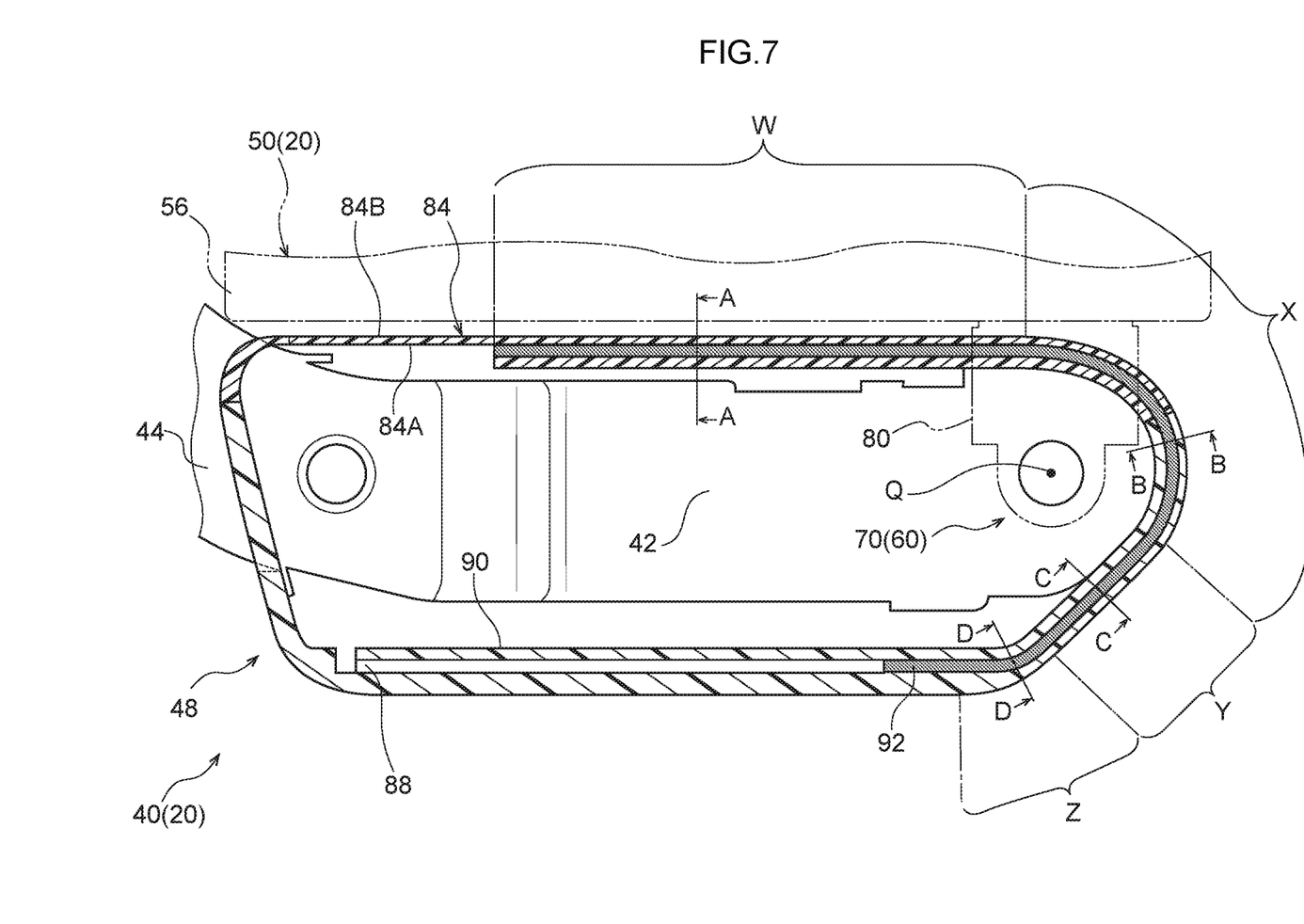
FIG. 7 is a cross-section illustrating an ottoman section of the vehicle seat in a state sectioned along line 7-7 in FIG. 3.
Figure 8:
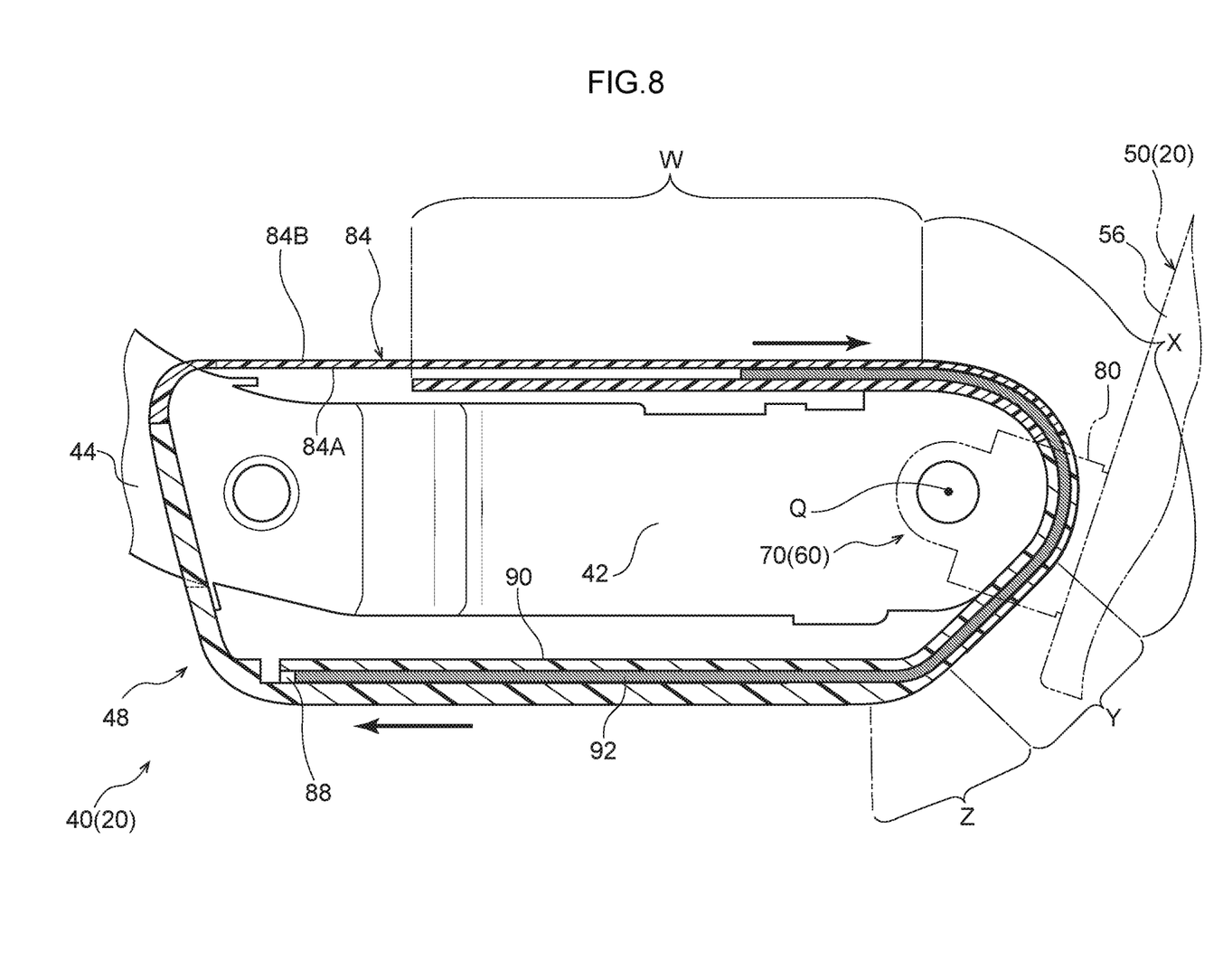
FIG. 8 is a cross-section illustrating an ottoman section of the vehicle seat in a state sectioned along line 8-8 in FIG. 4.

FIG. 7 and FIG. 8 are cross-sections illustrating the outer wall 84 of the cover member 48. As illustrated in FIG. 7 and FIG. 8, a leading end portion side of the cover member 48 (corresponding to the upper base of the trapezoid shape) is formed with a flat face portion W, a curved face portion X, an inclined portion Y, and a bent portion Z, provided continuously to one another. The flat face portion W is formed with a linear cross-section profile, and forms a flat face on the seat front face side of the cover member 48. The curved face portion X is formed with a circular arc shaped cross-section profile, and forms a curved face corresponding to a rotation trajectory of the headrest section 50. The curved face portion X is also formed with the elongated opening 82 following a peripheral direction of the curved face portion X. The coupling section 70 joined to the headrest section 50 is inserted through the opening 82. The inclined portion Y is formed extending at an incline from an end portion of the curved face portion X toward the seat back face side. An end portion of the inclined portion Y is bent toward a direction substantially parallel with the flat face portion W, thus forming the bent portion Z.

As illustrated in FIG. 6 to FIG. 8, a pair of upright walls 88 and a pair of inner walls 90 are provided inside the cover member 48. The pair of upright walls 88 are disposed on both short direction sides of the opening 82, and project upright from the corresponding outer wall 84 toward the inside of the cover member 48, extending so as to follow the extension direction of the opening 82. The pair of inner walls 90 are bent from leading ends of the pair of upright walls 88, and are disposed jutting out toward the opening 82 so as to oppose the outer wall 84. The inner walls 90 extend so as to oppose each of the flat face portion W, the curved face portion X, the inclined portion Y, and the bent portion Z of the outer wall 84.

In the present exemplary embodiment, the concealing sheet 92 is disposed between the pair of upright walls 88 such that the two seat width direction end portions of the concealing sheet 92 are supported by the pair of upright walls 88. In this state, the two end portions of the concealing sheet 92 are inserted into gaps G between the outer wall 84 and the inner walls 90. The concealing sheet 92 is formed in an elongated rectangular shape that is longer than the extension direction length of the opening 82. A seat width direction dimension of the concealing sheet 92 is set larger than the width of the opening 82.

During assembly of the cover member 48, the concealing sheet 92 is attached to the cover member 48 by inserting the two length direction ends of the concealing sheet 92 in the direction of the arrows in FIG. 6, namely into the upper cover 48A and the lower cover 48B configuring the top and bottom of the divided cover member 48. Moreover, an attachment hole 94 having substantially the same dimensions as the outer profile of the housing 80 of the coupling section 70 is formed through a length direction intermediate portion of the concealing sheet 92. The housing 80 of the coupling section 70 is inserted through the attachment hole 94 and fixed to the coupling section 70. Accordingly, when the coupling section 70 pivots in the extension direction of the opening 82 (the peripheral direction of the curved face portion X), the concealing sheet 92 covers the opening 82 while moving (sliding) along an inner face 84A of the outer wall 84 (see the directions indicated by the arrows in FIG. 8).

Figure 9:
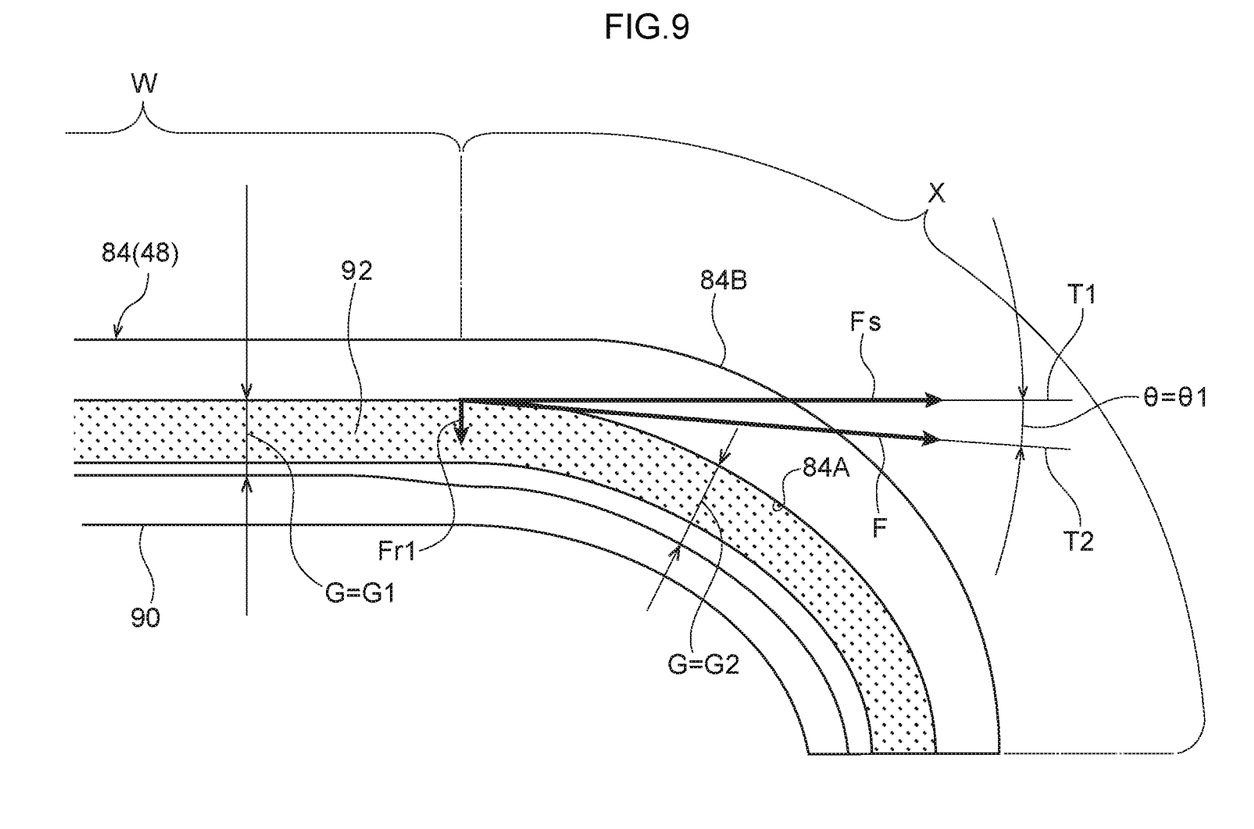
FIG. 9 is an enlarged partial cross-section illustrating the ottoman section illustrated in FIG. 7.
Figure 10A:
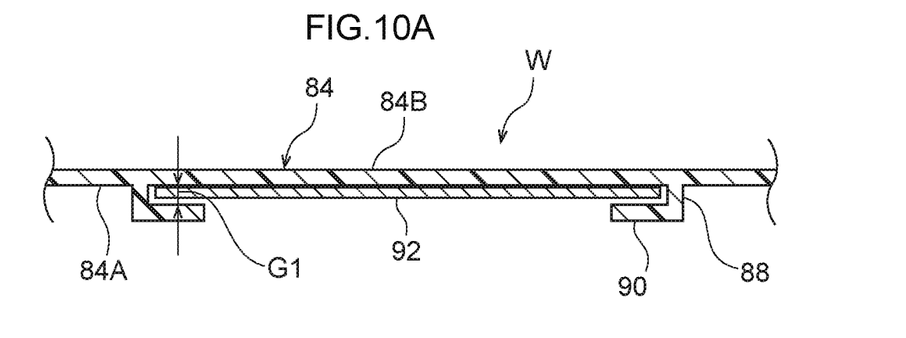
FIG. 10A is a cross-section illustrating a cover member of an ottoman section in a state sectioned along line A-A in FIG. 7.
Figure 10B:
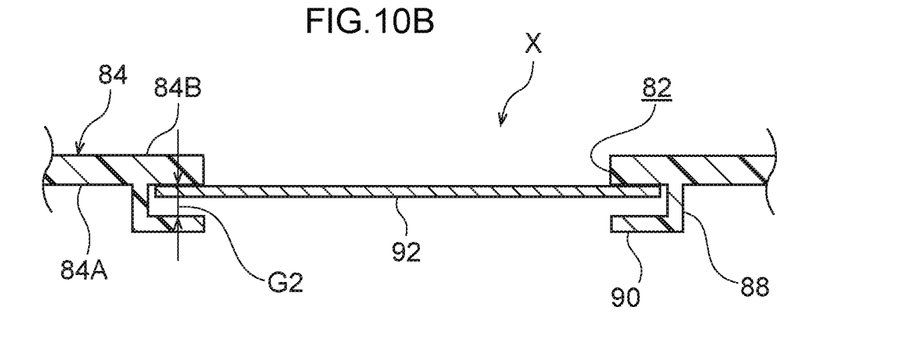
FIG. 10B is a cross-section illustrating a cover member of an ottoman section in a state sectioned along line B-B in FIG. 7.
Figure 10C:
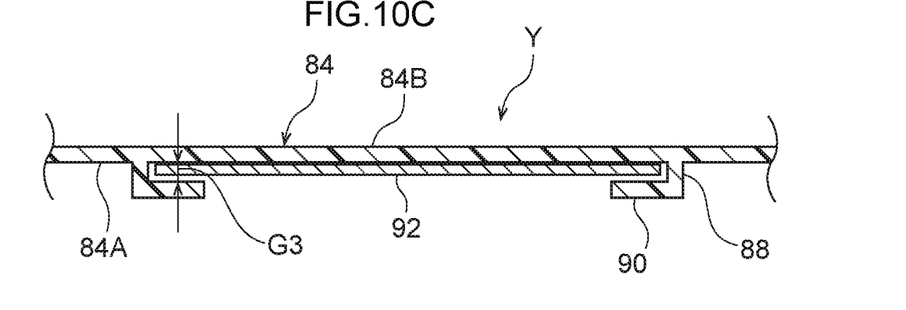
FIG. 10C is a cross-section illustrating a cover member of an ottoman section in a state sectioned along line C-C in FIG. 7.
Figure 10D:
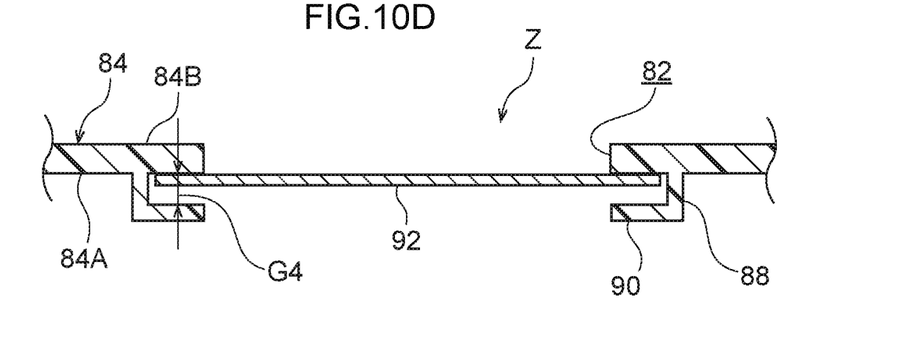
FIG. 10D is a cross-section illustrating a cover member of an ottoman section in a state sectioned along line D-D in FIG. 7.

FIG. 9 is an enlarged cross-section illustrating the flat face portion W and the curved face portion X of the outer wall 84 of the cover member 48. As illustrated in FIG. 9, in the outer wall 84, the flat face portion W is formed with a substantially uniform plate thickness, whereas the curved face portion X has a gradually changing plate thickness that is thicker than that of the flat face portion W. Accompanying this, in a region corresponding to the curved face portion X the radius of curvature of the inner face 84A that contacts the concealing sheet 92 is formed larger than the radius of curvature of an outer face 84B configuring a design face of the cover member 48. Namely, in the region of the outer wall 84 corresponding to the curved face portion X, a curve of the inner face 84A that the concealing sheet 92 contacts is gentler than a curve of the outer face 84B, thereby reducing interference between the concealing sheet 92 and the outer wall 84.

To further explain the above operation, explanation follows with reference to FIG. 9 regarding interference arising between the outer wall 84 and the concealing sheet 92 as the headrest section 50 pivots from the headrest position illustrated in FIG. 7 to the ottoman position illustrated in FIG. 8. When the concealing sheet 92 moves from the flat face portion W to the curved face portion X, the leading end portion side of the concealing sheet 92 in the direction of progress abuts the inner face 84A at the curved face portion X and deforms so as to bend and follow the inner face 84A. When this occurs, a component Fs corresponding to the direction of progress of the concealing sheet 92 at the flat face portion W and a component Fr1 in a direction perpendicular to the inner face 84A are combined in the concealing sheet 92, causing an external force F to act in a direction tangential to the inner face 84A. Accordingly, the smaller the component Fr1 that is affected by pressing force from the inner face 84A, the greater the reduction in interference between the concealing sheet 92 and the outer wall 84.

In the present exemplary embodiment, an angle θ (0°<θ<90°) formed between a straight line T1 in the direction of the component Fs and a straight line T2 in the direction of the external force F is denoted θ1. The component Fr1 may be expressed in the following terms:

$$Fr1 = F \times \sin\theta1 \tag{1}$$

Figure 11:
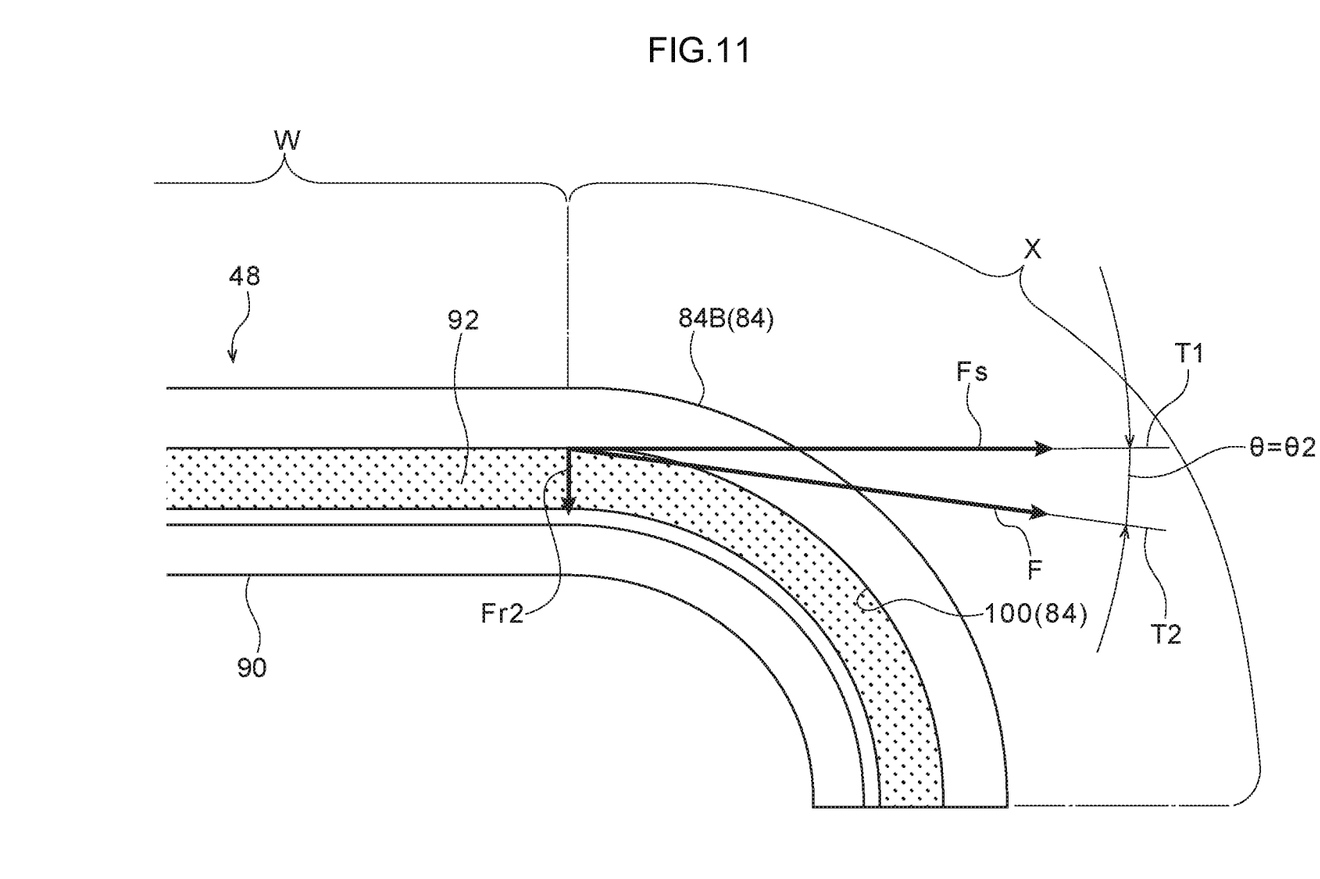
FIG. 11 is an enlarged partial cross-section corresponding to FIG. 9 to explain a comparative example.

For example, if the plate thickness of the outer wall 84 in the region corresponding to the curved face portion X were uniform as in a comparative example illustrated in FIG. 11, and an inner face 100 were formed with a radius of curvature so as to run parallel to the outer face 84B, the radius of curvature of the inner face 100 would be smaller than that of the inner face 84A of the present exemplary embodiment. Accordingly, if a component in a direction perpendicular to the inner face 100 at the flat face portion W is denoted Fr2 and θ=θ2, then the component Fr2 may be expressed in the following terms:

$$Fr2=F \times \sin \theta2 (\theta2>\theta1) \qquad (2)$$

In the present exemplary embodiment, the size of the external force F in Equations (1) and (2) is substantially equivalent to the drive force of the electric motor 72 of the coupling section 70, and is accordingly a constant value. Therefore the following relationship is established.

$$Fr1=F \times \sin \theta1 < Fr2=F \times \sin \theta2 \qquad (3)$$

According to Equation (3), setting the radius of curvature of the inner face 84A that contacts the concealing sheet 92 larger than the radius of curvature of the outer face 84B reduces interference between the concealing sheet 92 and the outer wall 84. Note that although not illustrated in detail in the drawings, in the region corresponding to the bent portion Z of the outer wall 84, the radius of curvature of the inner face 84A is likewise set larger than the radius of curvature of the outer face 84B, for similar reasons.

As illustrated in FIG. 9 and FIG. 10A to FIG. 10D, in the present exemplary embodiment it is worth noting the following characteristic of the gaps G formed between the outer wall 84 and the inner walls 90. In the present exemplary embodiment, the gaps G=G1 in the region corresponding to the flat face portion W, the gaps G=G2 in the region corresponding to the curved face portion X, the gaps G=G3 in the region corresponding to the inclined portion Y, and the gaps G=G4 in the region corresponding to the bent portion Z are configured in the manner expressed by the following inequality.

$$G1=G3<G2=G4 \qquad (4)$$

Namely, if the gaps G between the outer wall 84 and the inner walls 90 are too large, the disposition of the concealing sheet 92 becomes unstable, resulting in rattling or noise. Conversely, if the gaps G are too small at a location where the concealing sheet 92 and the outer wall 84 interfere with each other, this is a cause of increased sliding resistance to the concealing sheet 92. Accordingly, the gaps G (=G2=G4) corresponding to the curved face portion X and the bent portion Z where interference is comparatively great are set larger so as not to impede movement of the concealing sheet 92. Conversely, the gaps G (=G=G3) to the outer walls corresponding to the flat face portion W and the inclined portion Y where interference with the outer wall 84 is minor are set small, thereby stabilizing the disposition and movement of the concealing sheet 92.

Note that the gaps G are formed in the relationship expressed by Equation (4) above by setting the inner walls 90 with a thinner plate thickness at locations opposing the curved face portion X and the bent portion Z than at locations opposing the flat face portion W and the inclined portion Y. The combined plate thickness is thus regulated by reducing the plate thickness of the inner walls 90 at the curved face portion X where the outer wall 84 is thicker.

Operation and Advantageous Effects

In the vehicle seat 10 of the present exemplary embodiment, the seat sections 14A, 14B can be set to desired angles under the control of the non-illustrated ECU. Accordingly, when a seat section 14 is supporting the lower body of the seated occupant as in the case of the seat section 14A illustrated in FIG. 1, the seated occupant can place their feet on the cover member 48 of the ottoman section 40. On the other hand, when a seat section 14 is supporting the upper body of the seated occupant as in the case of the seat section 14B illustrated in FIG. 1, the headrest section 50 is able to support the head of the seated occupant.

In the present exemplary embodiment, the coupling section 70 coupling together the ottoman section 40 and the headrest section 50 is inserted through the opening 82 formed following the peripheral direction of the curved face portion X of the outer wall 84 of the cover member 48. The elongated concealing sheet 92 is disposed at the inner side of the outer wall 84 so as to slide along the inner face 84A following the pivoting of the coupling section 70. Accordingly, the concealing sheet 92 is able to keep the opening 82 covered at all times, and foreign objects, for example foreign objects stuck to the feet of the seated occupant, can be suppressed from entering the interior of the seat section 14 (ottoman section 40).

Note that the radius of curvature of the inner face 84A is larger than the radius of curvature of the outer face 84B at the curved face portion X of the outer wall 84. In other words, at the curved face portion X, the inner face 84A that contacts the concealing sheet 92 is formed with a gentler curve than the curve of the outer face 84B. This reduces interference between the inner face 84A and the concealing sheet 92, enabling the concealing sheet 92 to slide smoothly. Moreover, since this does not incur constraints regarding the outer face 84B, it is possible to achieve both functionality and pleasing design characteristics.

In the present exemplary embodiment, the two seat width direction end portions of the concealing sheet 92 are covered by the inner walls 90. Accordingly, if the concealing sheet 92 wobbles due to interference with the outer wall 84, the two end portions of the concealing sheet 92 abut and are supported by the inner walls 90. This enables movement of the concealing sheet 92 to be stabilized.

In the present exemplary embodiment, the gaps G=G2 between the outer wall 84 and the inner walls 90 at the curved face portion X where interference between the concealing sheet 92 and the outer wall 84 is comparatively great are set larger so as not to impede movement of the concealing sheet 92. On the other hand, the gaps G=G1 between the outer wall 84 and the inner walls 90 at the flat face portion W where interference with the outer wall 84 is lower than at the curved face portion X are set smaller, thereby stabilizing the disposition and movement of the concealing sheet 92. The concealing sheet 92 is able to slide even more smoothly as a result.

In the present exemplary embodiment, the plate thickness of the outer wall 84 is thicker at the curved face portion X than at the flat face portion W, while the plate thickness of the inner walls 90 is set thinner at locations opposing the curved face portion X than at locations opposing the flat face portion W by a commensurate amount. This suppresses an increase in the combined plate thicknesses of the cover member 48 at the curved face portion X, thereby enabling optimal plate thickness to be achieved throughout the overall cover member 48.

SUPPLEMENTARY EXPLANATION TO THE EXEMPLARY EMBODIMENT

Various modifications may be implemented within a range not departing from the spirit of the present disclosure. Obviously, the scope of rights encompassed by the present disclosure is not limited by the above exemplary embodiment.

Although the seat opening concealment structure is applied to the opening 82 formed in the ottoman section 40 in the above exemplary embodiment, the present disclosure is not limited thereto, and the seat opening concealment structure may be applied to an opening formed at another location on the seat sections 14. For example, application may be made to an opening formed in the lower casing 24 of the lower cushion section 16 or in the middle casing 32 of the middle cushion section 18.

Although the concealing sheet 92 is supported by the outer wall 84, the upright walls 88, and the inner walls 90 in the above exemplary embodiment, the present disclosure is not limited thereto, and the concealing sheet may be supported by the outer walls and the upright walls alone.

Although the plate thickness of the inner walls 90 is set thinner at the locations opposing the curved face portion X than the plate thickness of the inner walls 90 at the locations opposing the flat face portion W in the above exemplary embodiment, the present disclosure is not limited thereto, and the inner walls 90 may be formed with uniform plate thickness.

What is claimed is:

1. A seat opening concealment structure, comprising:
    a cover member that covers part of a vehicle seat, and that includes an outer wall including a curved face portion with a circular arc-shaped cross-section profile, the outer wall being formed with an opening having an elongated profile along a peripheral direction of the curved face portion, and the outer wall being formed with a larger radius of curvature at an inner face of the curved face portion than a radius of curvature at an outer face of the curved face portion;
    a rotatable body that is at least partially disposed outside the cover member and supported via a coupling section inserted through the opening so as to be rotatable relative to the cover member; and
    a concealing sheet that is provided with an attachment hole at which the coupling section is attached, that is longer than a length of the opening, that is supported at two width direction end portions of the concealing sheet so as to be slidable along the inner face of the outer wall, and that covers the opening.

2. The seat opening concealment structure of claim 1, wherein:
    an inner wall is provided inside the cover member so as to be disposed opposing the outer wall, so as to extend along at least the curved face portion, and so as to cover the two end portions of the concealing sheet; and
    the two end portions of the concealing sheet are respectively inserted into a gap formed between the outer wall and the inner wall.

3. The seat opening concealment structure of claim 2, wherein:
    the concealing sheet extends so as to straddle the curved face portion of the outer wall and a flat face portion at which the outer wall is formed with a flat face continuing from the curved face portion; and
    the gap formed between the outer wall and the inner wall is formed so as to be larger at the curved face portion than at the flat face portion.

4. The seat opening concealment structure of claim 3, wherein:
    a radius of curvature of the inner face of the outer wall is larger than a radius of curvature of the outer face of the outer wall, whereby that a plate thickness of the outer wall at the curved face portion is thicker than a plate thickness of the outer wall at the flat face portion; and
    a plate thickness of the inner wall at a location disposed opposing the curved face portion is thinner than a plate thickness of the inner wall at a location disposed opposing the flat face portion.

5. The seat opening concealment structure of claim 2, wherein:
    the inner wall is integrally formed with a pair of upright walls projecting upright at an inner side of the cover member from both short direction sides of the opening in the outer wall; and
    the two width direction end portions of the concealing sheet are supported by the pair of upright walls.

6. The seat opening concealment structure of claim 1, wherein:
    the cover member is disposed so as to cover a leading end of a seat section configuring a vehicle seat, the seat section being coupled to a base section fixed to a vehicle floor and configured to tilt about an axis with an axial direction along the seat width direction and to support either an upper body or a lower body of a seated occupant;
    the rotatable body is supported by the cover member so as to be rotatable between a headrest position and an ottoman position;
    the rotatable body is configured to support the head of the seated occupant in a state in which the rotatable body is positioned at the headrest position; and
    the cover member is configured to support the feet of the seated occupant in a state in which the rotatable body is positioned at the ottoman position.

* * * * *